(12) United States Patent
Perumal et al.

(10) Patent No.: US 12,382,390 B2
(45) Date of Patent: Aug. 5, 2025

(54) MODEM WITH BUILT-IN AUTOMATED POWER AND PERFORMANCE MONITORING

(71) Applicant: QUALCOMM Incorporated, San Diego, CA (US)

(72) Inventors: Velusamy Perumal, Salem (IN); Sridhar Veera, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 18/004,363

(22) PCT Filed: Aug. 12, 2021

(86) PCT No.: PCT/US2021/045730
§ 371 (c)(1),
(2) Date: Jan. 5, 2023

(87) PCT Pub. No.: WO2022/040008
PCT Pub. Date: Feb. 24, 2022

(65) Prior Publication Data
US 2023/0284140 A1    Sep. 7, 2023

(30) Foreign Application Priority Data
Aug. 17, 2020   (IN) .............................. 202041035337

(51) Int. Cl.
*H04W 52/02*     (2009.01)
*G06F 11/07*     (2006.01)
*H04L 12/10*     (2006.01)
*H04W 24/10*     (2009.01)

(52) U.S. Cl.
CPC ..... *H04W 52/0219* (2013.01); *G06F 11/0766* (2013.01); *G06F 11/0793* (2013.01); *H04L 12/10* (2013.01); *H04W 24/10* (2013.01)

(58) Field of Classification Search
CPC ...... G06F 1/3287; G06F 1/26; G06F 11/3058; H04W 52/0219; H04W 24/10; H04L 12/10
See application file for complete search history.

(56) References Cited

U.S. PATENT DOCUMENTS 7,254,734 B2 *   8/2007   Lehr ....................... H04L 12/44
                                                      713/340
8,560,026 B2 *  10/2013   Chanterac ......... H04W 52/0245
                                                       455/563

(Continued)

FOREIGN PATENT DOCUMENTS

| EP | 3337245 A1 | 6/2018 |
| WO | 2014165605 A1 | 10/2014 |
| WO | 2018031259 A1 | 2/2018 |

OTHER PUBLICATIONS

International Search Report and Written Opinion—PCT/US2021/045730—ISA/EPO—Nov. 29, 2021.

*Primary Examiner* — Bryce P Bonzo
*Assistant Examiner* — Xinyuan Yu
(74) *Attorney, Agent, or Firm* — Patterson + Sheridan, L.L.P./Qualcomm

(57) ABSTRACT

Certain aspects of the present disclosure provide techniques for communicating a dynamically scheduled transmission that overwrites a transmission in a semi-static scheduling occasion. A method performed by a user equipment (UE) includes receiving a first control message, activating a first semi-static scheduling configuration and a second semi-static scheduling configuration for full duplex communication, wherein: the first semi-static scheduling configuration comprises a semi-persistent scheduling (SPS) occasion and the second semi-static scheduling configuration comprises a configured grant (CG) occasion. The method may further include receiving a second control message dynamically (Continued)

scheduling a transmission that overwrites a downlink transmission in the SPS occasion or an uplink transmission in the CG occasion and taking one or more actions to communicate at least the transmission that overwrites the downlink transmission in the SPS occasion or the uplink transmission in the CG occasion.

30 Claims, 6 Drawing Sheets

(56) References Cited

U.S. PATENT DOCUMENTS

| | | |
|---|---|---|
| 10,477,483 B2 | 11/2019 | Chen et al. |
| 2004/0082295 A1 | 4/2004 | Ngai et al. |
| 2008/0201595 A1* | 8/2008 | Kawasaki ............... G06F 1/329 |
| | | 713/340 |
| 2012/0129564 A1 | 5/2012 | De La Cropte De Chanterac |
| 2013/0111243 A1* | 5/2013 | Barnette ............... G06F 1/3231 |
| | | 713/323 |
| 2013/0142049 A1 | 6/2013 | Jim et al. |
| 2014/0075057 A1* | 3/2014 | Sakr ....................... H04W 12/45 |
| | | 710/36 |
| 2014/0129892 A1* | 5/2014 | Magin ................. G06F 11/0706 |
| | | 714/746 |
| 2014/0192693 A1 | 7/2014 | Lee et al. |
| 2014/0301259 A1 | 10/2014 | Homchaudhuri et al. |
| 2020/0241951 A1* | 7/2020 | Koropoff .............. G06F 40/169 |
| 2020/0250178 A1* | 8/2020 | Boster .................. G06F 16/248 |

* cited by examiner

MODEM WITH BUILT-IN AUTOMATED POWER AND PERFORMANCE MONITORING

CROSS-REFERENCE TO RELATED APPLICATION(S)

This application is a national stage application under 35 U.S.C. 371 of PCT/US2021/045730, filed Aug. 12, 2021, which claims benefit of and priority to India Patent Application No. 202041035337, filed Aug. 17, 2020, which are assigned to the assignee hereof and hereby expressly incorporated by reference herein in their entireties as if fully set forth below and for all applicable purposes.

INTRODUCTION

Aspects of the present disclosure relate to wireless communications, and more particularly, to techniques for power monitoring of a wireless modem.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for debugging a wireless modem. The method generally includes determining a benchmark current value for the wireless modem, measuring an actual current value of the wireless modem, transitioning the wireless modem into a shutdown mode when the measured actual current value is greater than the benchmark current value for a threshold amount of time, and generating, after transitioning the wireless modem into the shutdown mode, a crash report, the crash report including operating information associated with a plurality of clients associated with the wireless modem prior to transitioning the wireless modem into the shutdown mode.

Certain aspects can be implemented in an apparatus for wireless communication. The apparatus includes a memory comprising executable instructions and one or more processors configured to execute the executable instructions and cause the apparatus to: determine a benchmark current value for the wireless modem, measure an actual current value of the wireless modem, transition the wireless modem into a shutdown mode when the measured actual current value is greater than the benchmark current value for a threshold amount of time, and generate, after transitioning the wireless modem into the shutdown mode, a crash report, the crash report including operating information associated with a plurality of clients associated with the wireless modem prior to transitioning the wireless modem into the shutdown mode.

Certain aspects can be implemented in an apparatus for wireless communication. The apparatus includes means for determining a benchmark current value for the wireless modem, means for measuring an actual current value of the wireless modem, means for transitioning the wireless modem into a shutdown mode when the measured actual current value is greater than the benchmark current value for a threshold amount of time, and means for generating, after transitioning the wireless modem into the shutdown mode, a crash report, the crash report including operating information associated with a plurality of clients associated with the wireless modem prior to transitioning the wireless modem into the shutdown mode.

Certain aspects can be implemented in a non-transitory computer-readable medium for wireless communication. The non-transitory computer-readable medium comprises executable instructions that, when executed by one or more processors of an apparatus, cause the apparatus to: determine a benchmark current value for the wireless modem, measure an actual current value of the wireless modem, transition the wireless modem into a shutdown mode when the measured actual current value is greater than the benchmark current value for a threshold amount of time, and generate, after transitioning the wireless modem into the shutdown mode, a crash report, the crash report including operating information associated with a plurality of clients associated with the wireless modem prior to transitioning the wireless modem into the shutdown mode.

Certain aspects can be implemented in a computer program product for debugging a wireless modem. The computer program product may be embodied on a computer-readable storage medium and may comprise code for: determining a benchmark current value for the wireless modem, measuring an actual current value of the wireless modem, transitioning the wireless modem into a shutdown mode when the measured actual current value is greater than the benchmark current value for a threshold amount of time, and generating, after transitioning the wireless modem into the shutdown mode, a crash report, the crash report including operating information associated with a plurality of clients associated with the wireless modem prior to transitioning the wireless modem into the shutdown mode.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
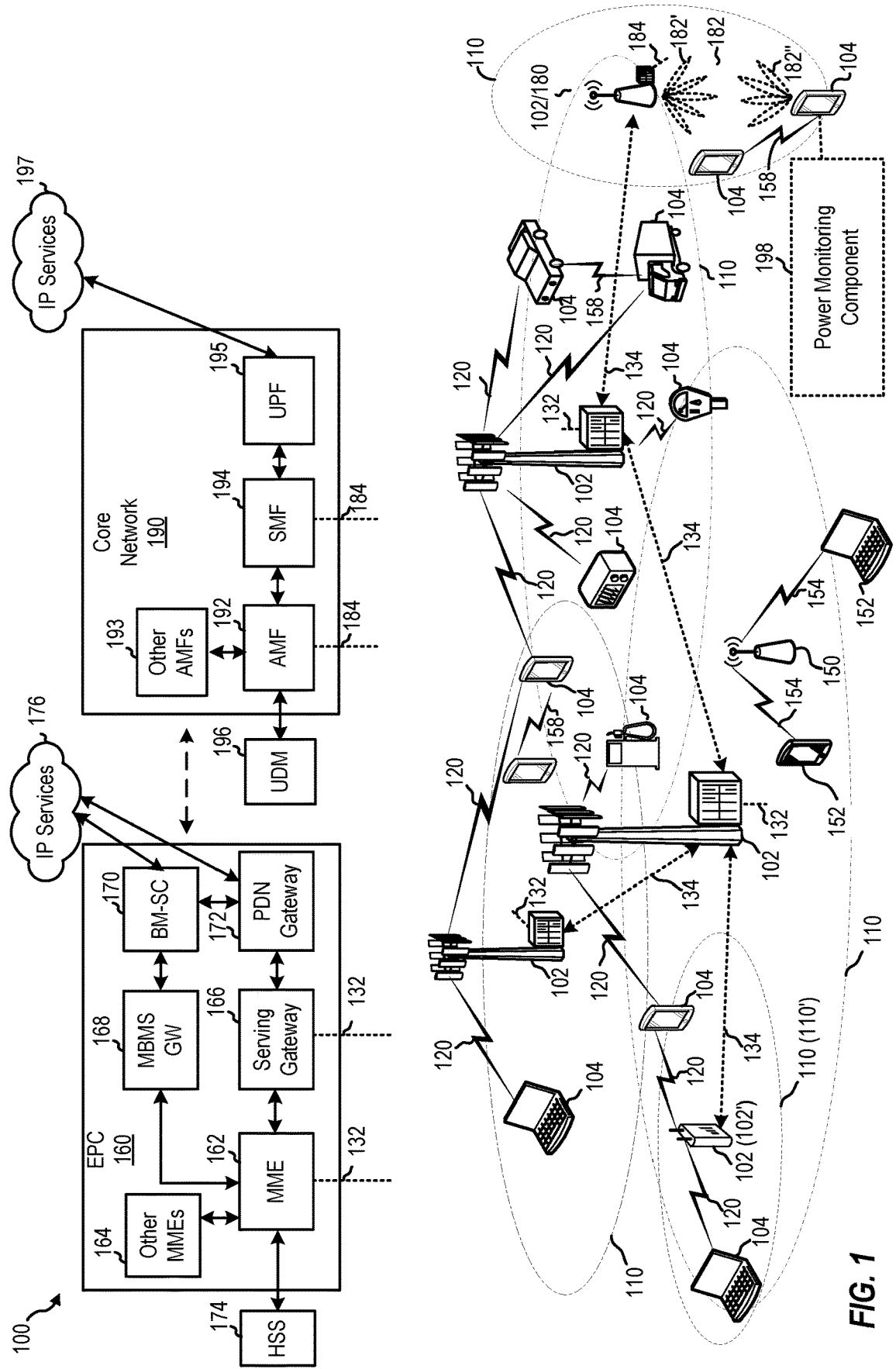
FIG. 1 is a block diagram conceptually illustrating an example wireless communication network.

Aspects of the present disclosure provide apparatuses, methods, processing systems, and computer-readable mediums for built-in power monitoring and debugging of a wireless modem.

For example, wireless communication devices, such as user equipments (UEs), may communicate wirelessly using a wireless modem. The wireless modem may be associated with a plurality of clients each for facilitating a different type of communication, such as long term evolution (LTE) communication, wide area network (WAN) communication, fifth generation (5G) new radio (NR) communication, global positioning system (GPS) communication, and others. Though certain aspects are described with respect to a UE including a wireless modem, it should be understood that the aspects equally apply to any suitable apparatus including a wireless modem.

In some cases, the wireless modem may receive votes from one or more of these clients, requesting a desired power and/or bandwidth/clock frequency to perform one or more operations. In response to the votes, the wireless modem may allocate power and/or bandwidth/clock frequency for the one or more operations associated with the one or more clients. When performing the one or more operations, the wireless modem may expect to consume a certain amount of current and, as a result, a certain amount of battery power. However, there are certain cases where a higher than expected current value is being used to perform the one or more operations, leading to increased power consumption, shorter battery life, and poorer user experience.

Generally, it would be beneficial to determine the cause of this higher than expected current value and increased power consumption. However, existing modem design does not have the flexibility to detect and log abnormal wireless modem power consumption. Instead, issues with power consumption associated with clients of a wireless modem are typically only able to be tested in laboratory settings. Moreover, even in laboratory settings, certain power consumption issues may not be feasible to be replicated in the lab. Therefore, there is a need for improve internal tools/modem architecture to allow wireless modems to self-monitor power consumption over a period of time.

Accordingly, aspects of the present disclosure provide techniques for automated power and performance monitoring within a wireless modem. For example, aspects of the present disclosure provide techniques for implementing built-in wireless modem power consumption performance monitoring to automatically detect power consumption issues and log system information for debugging the power consumption issues. These techniques may allow for the collection of system information from end-users directly experiencing the power consumption issues rather than trying to reproduce these issues in a laboratory setting. Additionally, these techniques avoid having to use cumbersome and bothersome external power tools to monitor the power consumption of a wireless modem.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same.

Similarly, the transmit and receive directions for UE 104 may or may not be the same.

Figure 4:
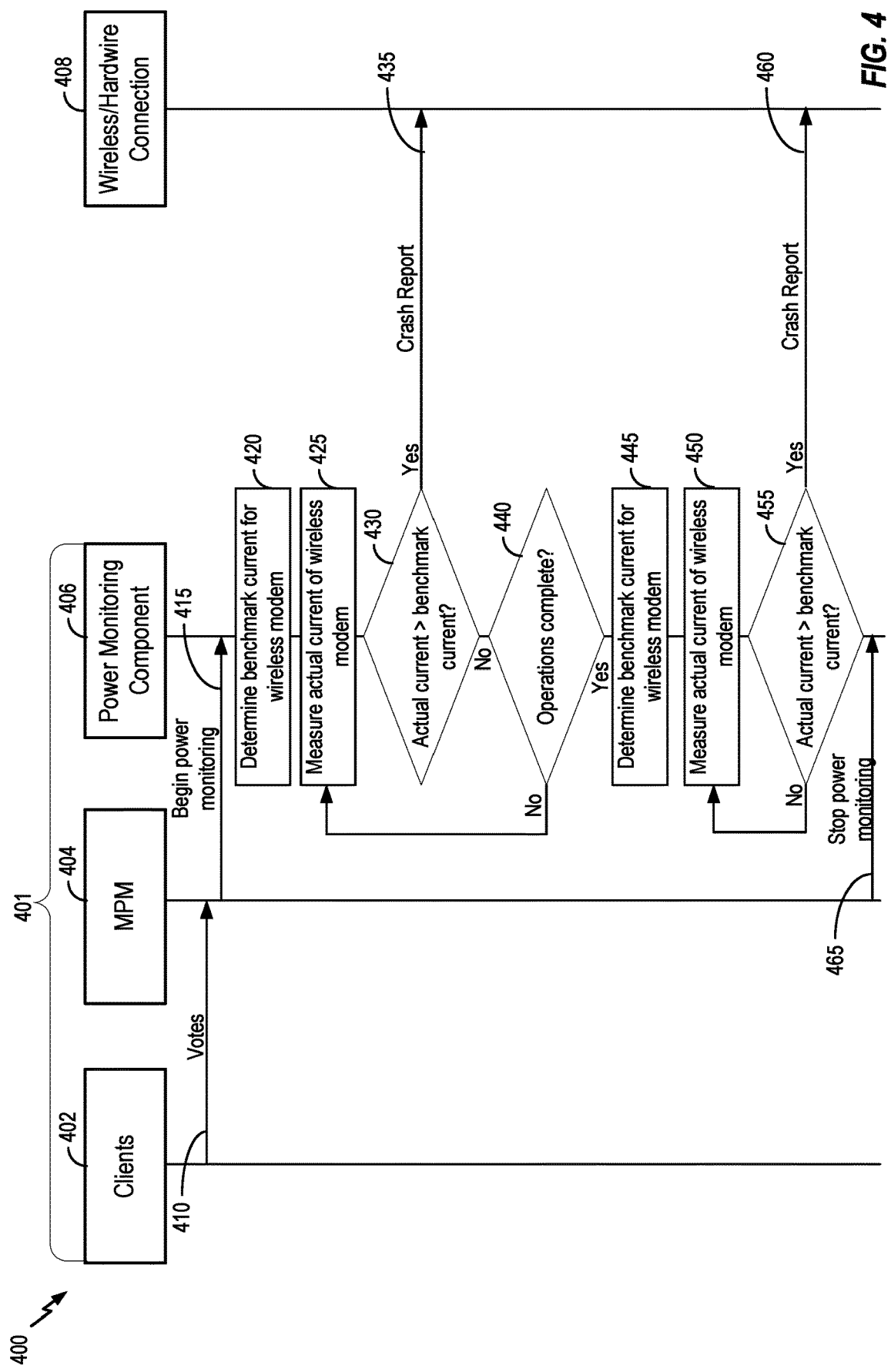
FIG. 4 is a call flow diagram illustrating example operations for monitoring power consumption associated with a wireless modem of a user equipment.
Figure 5:
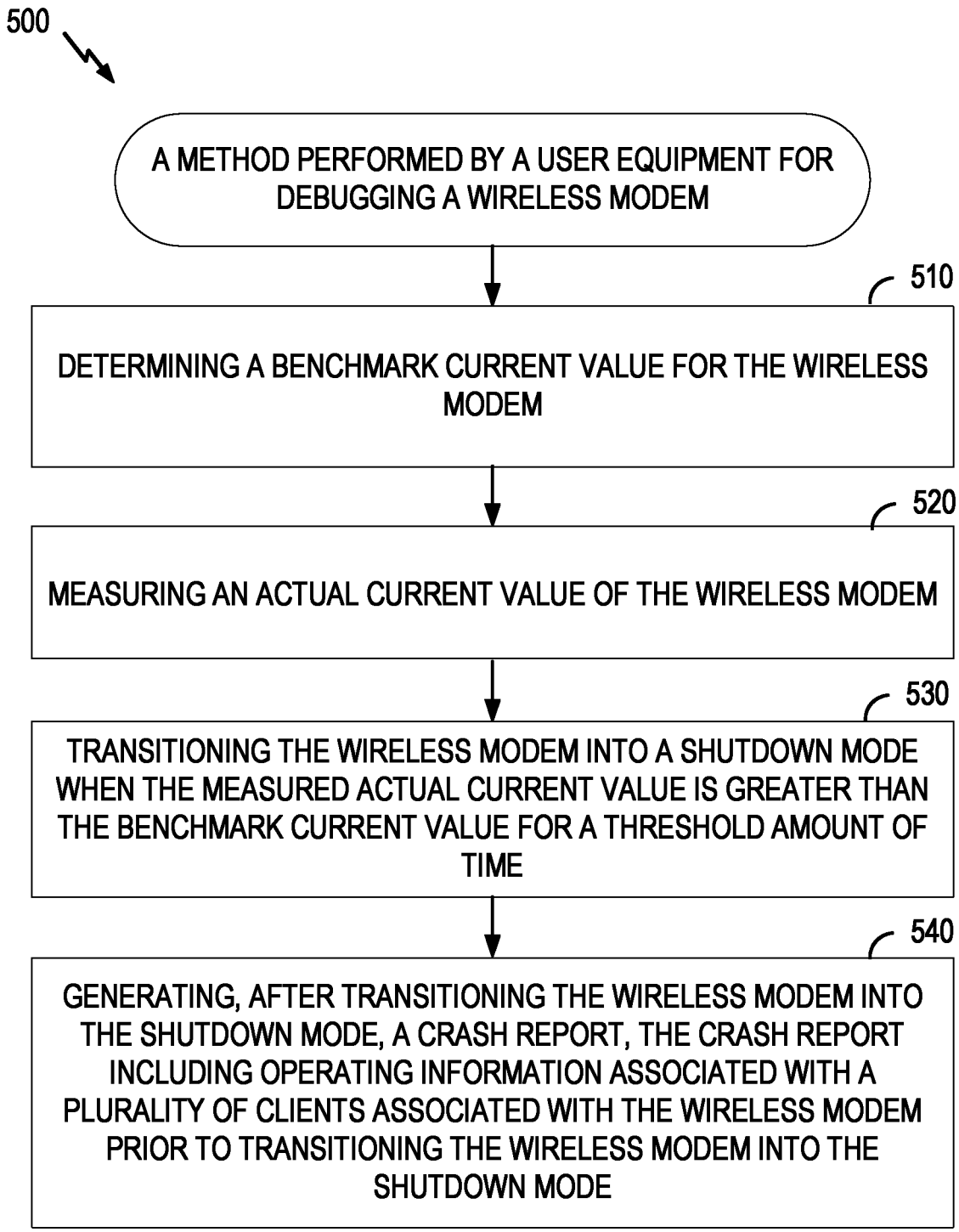
FIG. 5 is a flow diagram illustrating example operations for debugging the wireless modem of a user equipment.

Wireless communication network 100 includes power monitoring component 198, which may be configured to perform the operations illustrated in one or more of FIG. 4 or 5, as well as other operations described herein for monitoring power consumption of a wireless modem and debugging power consumption issues associated with the wireless modem.

Figure 2:
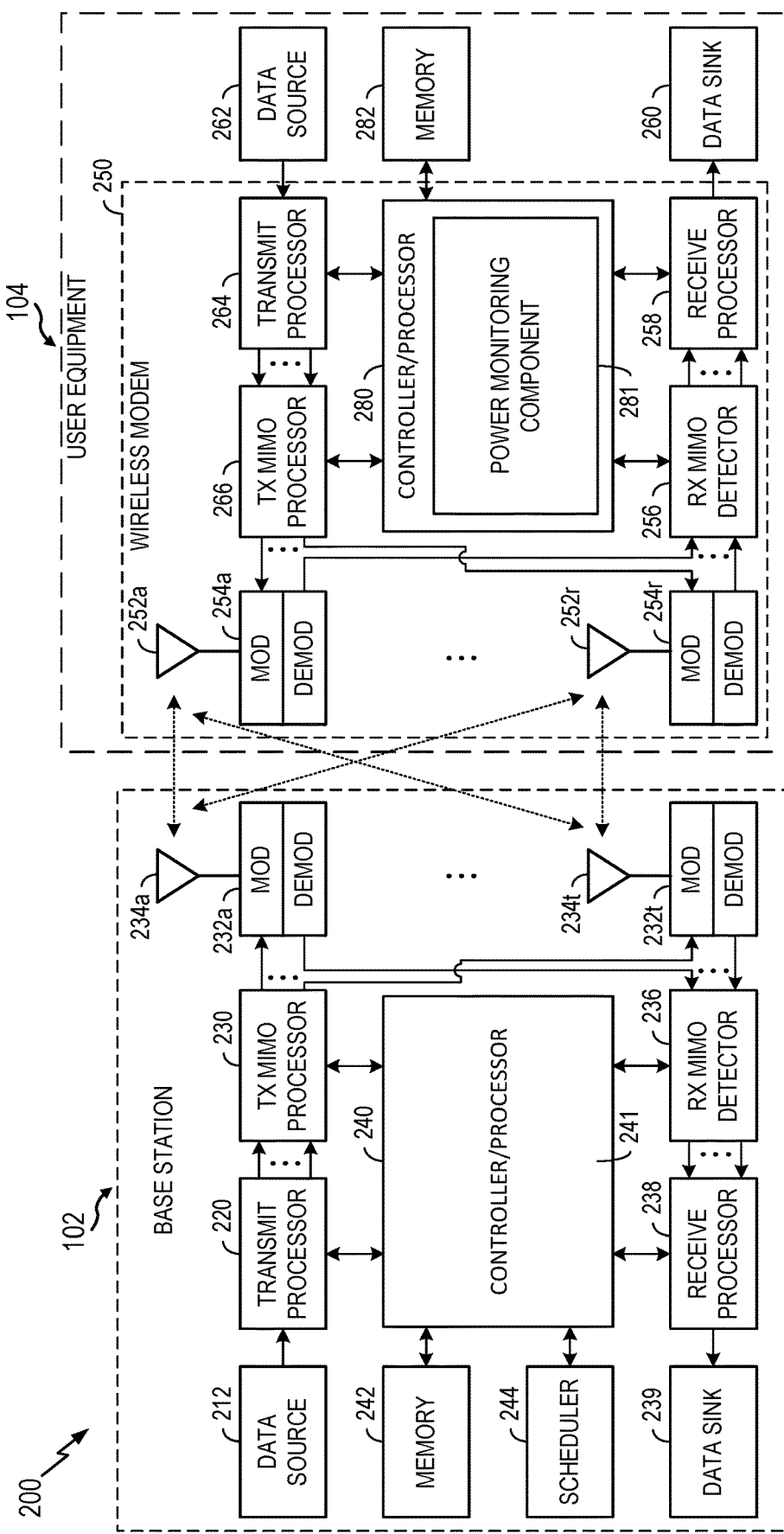
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Generally, UE 104 includes a wireless modem 250, which may handle modulation/demodulation and encoding/decoding of signals for wireless communication. As shown, the wireless modem 250 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

As shown, the wireless modem 250 of the UE 104 includes a controller/processor 280, which may be configured to implement various functions related to wireless communications. In the depicted example, controller/processor 280 includes power monitoring component 281, which may be representative of power monitoring component 198 of FIG. 1. Notably, while depicted as an aspect of controller/processor 280 power monitoring component 281 may be implemented additionally or alternatively in various other aspects of UE 104 in other implementations.

Figure 3:
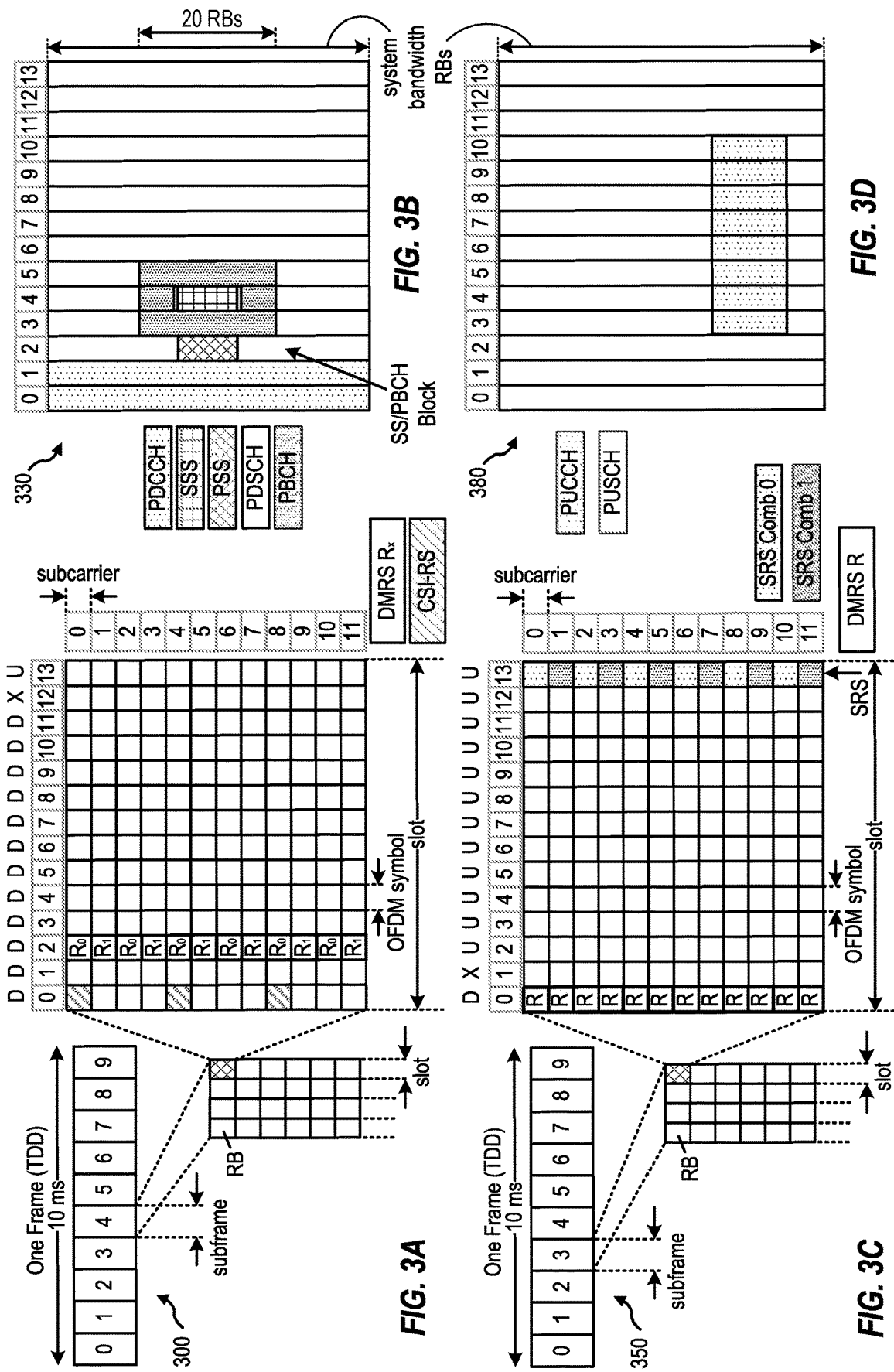
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Modem with Built-In Power and Performance Monitoring

Battery or power consumption is a critical concern given the number of features and technologies being introduced into user equipments (UEs) today. One power consumer in a UE is a wireless modem. Wireless modems generally handle modulation/demodulation and encoding/decoding of signals for wireless communication. Wireless modems may manage communication from many different types of communication, such as code division multiple access (CDMA) communication, third generation (3G) evolution data (EV-DO) communication, fourth generation (4G) long term evolution (LTE) communication, fifth generation (5G) new radio (NR) communication, global positioning system (GPS) communication, wide local area network (WLAN) communication, and the like.

In some cases, each of these different types of communication may correspond to a different client associated with the wireless modem. Additionally, each of these different clients may vie for shared resources from the wireless modem in order to perform certain operations for communicating. Accordingly, these clients may each, at certain times, submit votes to the wireless modem, generally indicating a desired power state for these clients, such as a particular power (e.g., voltage and current) and/or a particular bandwidth or clock frequency, to perform the certain operations. As such, when performing the operations associated with a particular client, additional power is afforded to this client and a clock frequency of the wireless modem increases, which consumes battery power of the UE. Generally, once a client is finished with the operations, the power and clock frequency for this client may be decreased. Further, when no operations are needing to be performed, the wireless modem may enter an idle or standby mode to conserve battery power.

There may be cases, however, where the wireless modem is consuming more power than expected during operations associated with one or more clients, such as where the wireless modem is being kept awake (e.g., prevented from entering the standby/idle/sleep mode) for longer than expected. These issues may arise in concurrency use-cases and corner scenarios, respectively. For example, during a concurrency case, one or more clients may submit votes to the wireless modem to perform one or more operations. As noted above, the votes may indicate a desired power state of the one or more clients. In some cases, the desired power states of the one or more clients may each be associated with benchmark current values, as shown in Table 1, below.

TABLE 1

| Technology Scenario | Power Benchmark |
| --- | --- |
| Modem Power Down | 1 mA |
| Modem Standby | 5 mA |
| GSM | 100 mA |
| EVDO | 120 mA |
| CDMA | 150 mA |
| WCDMA | 200 mA |
| LTE | 220 mA |
| 5G NR | 600 mA |
| GPS | 80 mA |
| WAN | 180 mA |

For example, assuming the one or more clients submitting votes including a GPS client and a WAN client. In such cases, operations associated with the LTE client may require approximately 220 mA and operations associated with the WAN client may require approximately 180 mA. Accordingly, based on the received votes, the wireless modem may allocate a particular clock frequency to handle the operations associated with the LTE client and the WAN client, which will consume approximately 400 mA.

However, there may be cases in which another client, such as GPS, is operating in the background and did not submit a vote to the wireless modem. In such cases, when performing the one or more operations for the LTE client and the WAN client, which is expected to consume approximately 400 mA, an additional 80 mA of current may be consumed by the GPS client, which is unexpected by the wireless modem. This leads to abnormal power consumption and poor user experience.

Additionally, corner scenarios may arise after the one or more operations associated with the LTE client and the WAN client have been completed. For example, one the one or more operations with the LTE client and the WAN client have been completed, the wireless modem may reduce its clock frequency (e.g., thereby reducing current use) and transition into a standby/idle/sleep mode to conserve battery power. Generally, when operating in the standby/idle/sleep mode, it is expected that the wireless modem will consume approximately 5 mA, as shown in Table 1. However, there may be cases where another client, such as GPS, is unexpectedly operating in the background. In such cases, the GPS client may be unnecessarily keeping the wireless modem awake instead of allowing the wireless modem to transition into the standby/idle/sleep mode. This also leads to abnormal power consumption and poor user experience.

Adding to the issues of these use-cases and scenarios described above, existing modem design do not have flexibility to detect and log abnormal wireless modem power consumption. Instead, issues with power consumption associated with clients of a wireless modem are typically only able to be tested in laboratory scenarios during initial chipset bring-up programs for key internal/customer releases by power teams. However, some of the concurrency cases and corner scenarios may not be feasible to be replicated in lab. For example, in existing implementation, end-user testing and internal lab testing typically requires a connection to an external power monitoring tool to monitor wireless modem power consumption levels. However, it may not feasible to use this external power monitoring tool to monitor power consumption during scenarios, such as end-users using packet-switched data or circuit switched voice or other daily end-user scenarios. Additionally, using external power monitoring tools may be cumbersome and bothersome to end-users.

Thus, for all practical purposes, concurrency cases and corner scenarios may be missed during power consumption monitoring in the laboratory setting. Therefore, there is a need for improve internal tools/modem architecture to allow wireless modems to self-monitor power consumption over a period of time. Accordingly, aspects of the present disclosure provide techniques for automated power and performance monitoring within a wireless modem. For example, aspects of the present disclosure provide techniques for implementing in-built wireless modem power consumption performance monitoring to automatically detect power consumption issues and log system information for debugging the power consumption issues. These techniques may allow for the collection of system information from end-users directly experiencing the power consumption issues rather than trying to reproduce these issues in a laboratory setting. Additionally, these techniques avoid having to use cumbersome and bothersome external power tools to monitor the power consumption of a wireless modem.

More specifically, aspects of the present disclosure provide a power monitoring component that may be configured to monitor/measure power consumption associated with a wireless modem of a UE and to trigger generation of a crash report when the measured power consumption of the wireless modem is larger than an expected benchmark power consumption value for the wireless modem. According to aspects, the crash may include information for determining a cause of the larger-than-expected measured power consumption for the modem.

Example Call Flow Illustrating Operations for
Monitoring Power Consumption Associated with a
Wireless Modem of a User Equipment FIG. 4 is a call flow diagram illustrating example operations 400 for monitoring power consumption associated with a wireless modem 401 of a UE, such as the UE 104. As shown, the operations 400 involve different components of a wireless modem 401, such as a plurality of clients 402, a modem power module (MPM) 404, and a power monitoring component 406, as well as a wireless/hardwire connection 408. In some cases, the wireless connection 408 may comprise a radio connection facilitated by the wireless modem 410 via one or more antennas (e.g., antennas 452 of the UE 104 illustrated in FIG. 2). In some cases, the hardwire connection 408 may include hardwire connections, such as a USB connection or any other hardwire connection to a UE. In some cases, the wireless modem 401 may include the wireless modem 250 of the UE 104 illustrated in FIG. 2.

The MPM module 404 may be configured to manage power requirements for a plurality of clients 402 within the wireless modem 401. For example, the plurality of clients 402 may include one or more of a WAN client, a power down client, a single-carrier radio transmission technology client (lx) client, an EVDO client, a CDMA client, a wideband code division multiple access (WCDMA) client, an LTE client, a 5G NR client, or a GPS. Notably, the wireless modem 401 may include other clients.

As illustrated at 405, the MPM module 404 of the wireless modem 401 receives votes from each of one or clients of the plurality of clients 402. For example, in some cases, the MPM module 404 may receive votes from the WAN client and the LTE client. The votes generally indicate a desired power level for the one or more clients (e.g., that these clients will be in an active mode rather than a standby/idle/sleep mode). Based on the votes, the MPM module 404 may allocate a particular bandwidth or clock frequency for the one or more clients to perform one or more operations associated with the one or more clients.

Thereafter, as shown at 415, the MPM module 404 sends control signaling to the power monitoring component 406 in the wireless modem 401 to begin monitoring a power associated with the wireless modem 401. Based on the control signaling, at 420, the power monitoring component 406 determines a benchmark current value for the wireless modem 401. The benchmark current value for the wireless modem 401 may be based on the received votes from each of the one or more clients of the plurality of clients associated with the wireless modem 401. For example, as noted above, the MPM module 404 allocates bandwidth or clock frequency based on the votes received from the one or more clients of the plurality of clients 402. The allocated bandwidth or clock frequency may correspond to a particular benchmark current value.

In some cases, at 420, the power monitoring component 406 may determine an individual benchmark current value for each of the one or more clients for which a vote has been received. More specifically, with reference to Table 1 and using the example that the MPM module 404 receiving votes WAN client and the LTE client, the power monitoring component 406 may determine a first individual benchmark current value for the WAN client of 180 mA. The power monitoring component 406 may also determine a second individual benchmark current value for the LTE client of 220 mA. Thereafter, the power monitoring component 406 may aggregate the individual benchmark current values to determine the benchmark current value for the wireless modem 401. For example, in some cases, the power monitoring component 406 adds the first individual benchmark current value for the WAN client (e.g., 180 mA) with the second individual benchmark current value for the LTE client (e.g., 220 mA) to determine a benchmark current value of 400 mA for the wireless modem 410. According to aspects, the benchmark current value for the wireless modem 401 represents a current value that should be expected to be seen when performing the one or more operations associated with the one or more clients for which a vote has been received.

Thereafter, as illustrated at 425, the power monitoring component 406 measures an actual current value of the wireless modem 401. In some cases, the power monitoring component may measure the actual current value of the wireless modem 401 using one or more current sensors within the wireless modem 401.

Thereafter, at 430, the power monitoring component 406 determines whether the actual current value of the wireless modem 401 is greater than the benchmark current value for the wireless modem 401 for a threshold amount of time. When the measured actual current value is greater than the benchmark current value for the threshold amount of time (e.g., "Yes" at 430), the power monitoring component 406 may transition the wireless modem 401 into a shutdown mode. Thereafter, the power monitoring component 406 generates, after transitioning the wireless modem 401 into the shutdown mode, a crash report. The crash report may include operating information associated with the plurality of clients 402 associated with the wireless modem 401 prior to transitioning the wireless modem into the shutdown mode.

In some cases, the operating information associated with the plurality of clients may include one or more of a list of active clients of the plurality of clients 402, a list of inactive clients of the plurality of clients 402, benchmark current values for active clients of the plurality of clients 402, a clock frequency of the wireless modem 401, the measured actual current value of the wireless modem 401, the determined benchmark current value for the wireless modem 401, an active duration for each active client of the plurality of clients 402, an amount of power consumed by the wireless modem 401, and a sleep or idle mode duration associated with each active client of the plurality of clients 402.

Thereafter, as shown at 435, the crash report may be transmitted, via a wireless connection 408, to a base station using the wireless modem 401. In other cases, the crash report may be output at 435 for transmission via hardwire connection 408, for example, using an external power monitoring tool. The crash report may allow for debugging the reason why the actual current value of the wireless modem 401 was greater than the benchmark current value for the wireless modem 401. For example, in some cases, the crash report may show a concurrency case where at least one client of the plurality of clients 402 was active and performing operations but did not submit votes to the MPM module 404, causing the power monitoring component 406 to determine a lower benchmark current value for the wireless modem 401 and causing unexpected and abnormal power consumption.

Returning back to 430, when the measured actual current value is not greater than the benchmark current value for the threshold amount of time (e.g., "No" at 430), the power monitoring component 406 may then determine at 440 whether the one or more operations associated with one or more clients of the plurality of clients 402 have been completed. If, at 440, the one or more operations associated with one or more clients have not been completed, operations 400 return to 425 with measuring the current value for the wireless modem 401 and determining whether the measured actual current value of the wireless modem 401 is greater than the benchmark current value for the wireless modem 401 at 430.

If, however, the one or more operations associated with the one or more clients have been completed ("Yes" at 440), the wireless modem 401 may transition into a standby or idle mode to conserve power. Accordingly, as illustrated at 445, based on the determination that the one or more operations associated with one or more clients have been completed, the power monitoring component 406 may determine a second benchmark current value for the wireless modem 401. In some cases, the second benchmark current value for the wireless modem 401 may comprise a benchmark current value for an idle mode or standby mode of the wireless modem. Thereafter, at 450, the power monitoring component 406 may measure the actual current value of the wireless modem 401 and, at, 455, determine whether the measured actual current value of the wireless modem 401 is greater than the second benchmark current value for the wireless modem 401.

If the measured actual current value of the wireless modem 401 is not greater than the second benchmark current value for the wireless modem 401 (e.g., "No" at 455), operations 400 return to 450 with the power monitoring component 406 measuring the actual current value of the wireless modem 401 and, at, 455, determining whether the measured actual current value of the wireless modem 401 is greater than the second benchmark current value for the wireless modem 401.

If, however, the measured actual current value of the wireless modem 401 is greater than the second benchmark current value for the wireless modem 401 (e.g., "Yes" at 455), the power monitoring component 406 may transition the wireless modem 401 into a shutdown mode. Thereafter, the power monitoring component 406 generates, after transitioning the wireless modem 401 into the shutdown mode, a crash report.

Thereafter, as shown at 435, the crash report may be transmitted, via a wireless connection 408, to a base station using the wireless modem 401. In other cases, the crash report may be output at 435 for transmission via hardwire connection 408, for example, using an external power monitoring tool. As noted above, the crash report may allow for debugging the reason why the actual current value of the wireless modem 401 was greater than the benchmark current value for the wireless modem 401. For example, in some cases, the crash report may show a corner scenario where that at least one client of the plurality of clients 402 was active and performing operations but did not submit votes to the MPM module 404, preventing the wireless modem 401 from transitioning into a standby or idle mode.

Thereafter, returning to operations 400, at some point in time (e.g., to reduce power consumption), the MPM module 404 may transmit control signaling to the power monitoring component 406 to stop power monitoring, as shown at 465.

Example Method for Debugging a Wireless Modem of a User Equipment

FIG. 5 is a flow diagram illustrating example operations 500 for wireless communication, in accordance with certain aspects of the present disclosure. The operations 500 may be performed, for example, by a UE (e.g., such as the UE 104 in the wireless communication network 100 of FIG. 1 and/or the UE 704 illustrated in FIGS. 7-12) for debugging a wireless modem of the UE. The operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the power monitoring component 281) obtaining and/or outputting signals.

Operations 500 begin in block 510 determining a benchmark current value for the wireless modem.

At block 520, the UE measuring an actual current value of the wireless modem.

At block 530, the UE transitions the wireless modem into a shutdown mode when the measured actual current value is greater than the benchmark current value for a threshold amount of time.

At block 540, the UE generates, after transitioning the wireless modem into the shutdown mode, a crash report, the crash report including operating information associated with a plurality of clients associated with the wireless modem prior to transitioning the wireless modem into the shutdown mode.

In some cases, operations 500 may further include receiving a vote from each of one or more clients of the plurality of clients associated with the wireless modem. In such cases, determining the benchmark current value for the wireless modem in block 510 may be based on the received votes from each of the one or more clients of the plurality of clients associated with the wireless modem.

In some cases, operations 500 may further include determining an individual benchmark current value for each of the one or more clients for which a vote is received. In some cases, operations 500 may further include aggregating the individual benchmark current values to determine the benchmark current value for the wireless modem.

In some cases, operations 500 may further include determining that operations associated with one or more clients of the plurality of clients have been completed. In such cases, based on the determination that the operations associated with one or more clients of the plurality of clients have been completed, the benchmark current value for the wireless modem determined in block 510 comprises a benchmark current value for an idle mode of the wireless modem.

In some cases, the plurality of clients comprise at least two of: a single-carrier radio transmission technology client, a code division multiple access client, a third generation (3G) evolution data (EV-DO) client, a fourth generation (4G) long term evolution (LTE) client, a fifth generation (5G) new radio (NR) client, a wideband code division multiple access client, a global positioning system client, a wide area network client, or a power down client.

In some cases, operations 500 further include transmitting the crash report to a base station using the wireless modem.

In some cases, operations 500 further include outputting the crash report for transmission via hardwire connection.

In some cases, the operating information associated with a plurality of clients associated with the wireless modem comprises one or more of: a list of active clients of the plurality of clients, a list of inactive clients of the plurality of clients, benchmark current values for active clients of the plurality of clients; a clock frequency of the wireless modem, the measured actual current value of the wireless modem, the determined benchmark current value for the wireless modem, an active duration for each active client of the plurality of clients, an amount of power consumed by the wireless modem, or a sleep or idle mode duration associated with each active client of the plurality of clients.

Example Wireless Communication Devices

Figure 6:
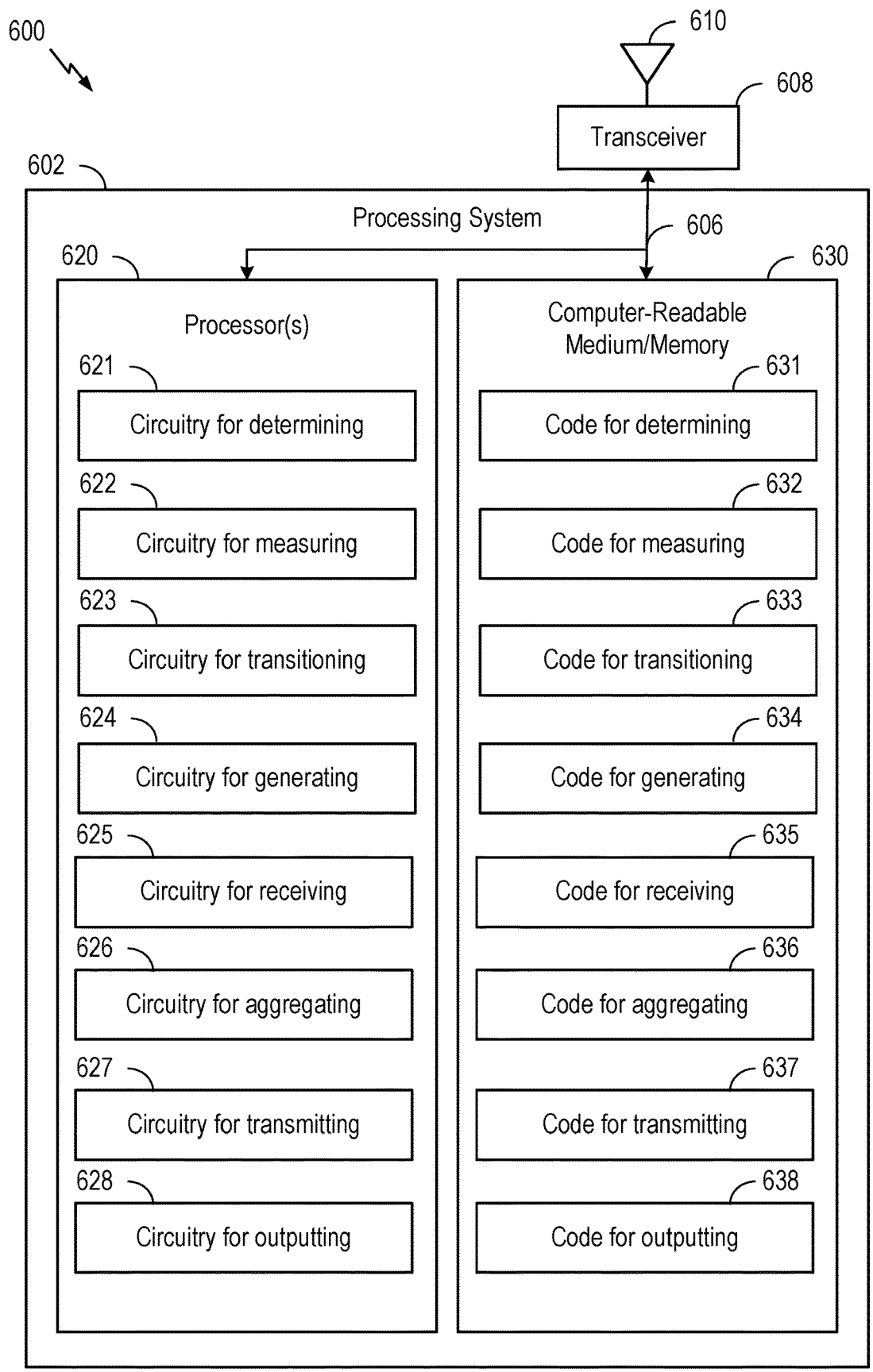
FIG. 6 depicts aspects of an example communications device.

FIG. 6 depicts an example communications device 600 that includes various components operable, configured, or adapted to perform operations for the techniques disclosed herein, such as the operations depicted and described with respect to FIGS. 4-5. In some examples, communication device 600 may be a user equipment 104 as described, for example with respect to FIGS. 1 and 2.

Communications device 600 includes a processing system 602 coupled to a transceiver 608 (e.g., a transmitter and/or a receiver). Transceiver 608 is configured to transmit (or send) and receive signals for the communications device 600 via an antenna 610, such as the various signals as described herein. Processing system 602 may be configured to perform processing functions for communications device 600, including processing signals received and/or to be transmitted by communications device 600.

Processing system 602 includes one or more processors 620 coupled to a computer-readable medium/memory 630 via a bus 606. In certain aspects, computer-readable medium/memory 630 is configured to store instructions (e.g., computer-executable code) that when executed by the one or more processors 620, cause the one or more processors 620 to perform the operations illustrated in FIGS. 4-5, or other operations for performing the various techniques discussed herein for monitoring power consumption of and debugging a wireless modem of the UE.

In the depicted example, computer-readable medium/memory 630 stores code 631 for determining, code 632 for measuring, code 633 for transitioning, code 634 for generating, code 635 for receiving, code 636 for aggregating, code 637 for transmitting, and code 638 for outputting.

In the depicted example, the one or more processors 620 include circuitry configured to implement the code stored in the computer-readable medium/memory 630, including circuitry 621 for determining, circuitry 622 for measuring, circuitry 623 for transitioning, circuitry 624 for generating, circuitry 625 for receiving, circuitry 626 for aggregating, circuitry 627 for transmitting, and circuitry 628 for outputting.

Various components of communications device 600 may provide means for performing the methods described herein, including with respect to FIGS. 4-5.

In some examples, means for transmitting (or means for outputting for transmission) may include the transceivers 254 and/or antenna(s) 252 of the user equipment 104 illustrated in FIG. 2 and/or transceiver 608, antenna 610, and/or bus 606 of the communication device 600 in FIG. 6.

In some examples, means for receiving (or means for obtaining) may include the transceivers 254 and/or antenna(s) 252 of the user equipment 104 illustrated in FIG. 2 and/or transceiver 608, antenna 610, and/or bus 606 of the communication device 600 in FIG. 6.

In some examples, means for determining, means for measuring, and means for transitioning, means for generating, and means for aggregating may include various processing system components, such as: the one or more processors 620 in FIG. 6, or aspects of the user equipment 104 depicted in FIG. 2, including receive processor 258, transmit processor 264, TX MIMO processor 266, and/or controller/processor 280 (including power monitoring component 281).

Notably, FIG. 6 is an example, and many other examples and configurations of communication device 600 are possible.

EXAMPLE CLAUSES

Implementation examples are described in the following numbered clauses:

Clause 1: A method for debugging a wireless modem, comprising: determining a benchmark current value for the wireless modem; measuring an actual current value of the wireless modem; transitioning the wireless modem into a shutdown mode when the measured actual current value is greater than the benchmark current value for a threshold amount of time; and generating, after transitioning the wireless modem into the shutdown mode, a crash report, the crash report including operating information associated with a plurality of clients associated with the wireless modem prior to transitioning the wireless modem into the shutdown mode.

Clause 2: The method of Clause 1, further comprising receiving a vote from each of one or more clients of the plurality of clients associated with the wireless modem, wherein determining the benchmark current value for the wireless modem is based on the received votes from each of the one or more clients of the plurality of clients associated with the wireless modem.

Clause 3: The method of Clause 2, further comprising: determining an individual benchmark current value for each of the one or more clients for which a vote is received; and aggregating the individual benchmark current values to determine the benchmark current value for the wireless modem.

Clause 4: The method of Clause 1, further comprising determining that operations associated with one or more clients of the plurality of clients have been completed.

Clause 5: The method of Clause 4, wherein, based on the determination that the operations associated with one or more clients of the plurality of clients have been completed, the benchmark current value for the wireless modem comprises a benchmark current value for an idle mode of the wireless modem.

Clause 6: The method of any of Clauses 1-5, wherein the plurality of clients comprise at least two of: a single-carrier radio transmission technology client, a code division multiple access client, a third generation (3G) evolution data (EV-DO) client, a fourth generation (4G) long term evolution (LTE) client, a fifth generation (5G) new radio (NR) client, a wideband code division multiple access client, a global positioning system client, a wide area network client, or a power down client.

Clause 7: The method of any of Clauses 1-6, further comprising transmitting the crash report to a base station using the wireless modem.

Clause 8: The method of any of Clauses 1-7, further comprising outputting the crash report for transmission via hardwire connection.

Clause 9: The method of any of Clauses 1-8, wherein the operating information associated with a plurality of clients associated with the wireless modem comprises one or more of: a list of active clients of the plurality of clients, a list of inactive clients of the plurality of clients, benchmark current values for active clients of the plurality of clients; a clock frequency of the wireless modem; the measured actual current value of the wireless modem; the determined benchmark current value for the wireless modem; an active duration for each active client of the plurality of clients; an amount of power consumed by the wireless modem; and a sleep or idle mode duration associated with each active client of the plurality of clients.

Clause 10: An apparatus, comprising: a memory comprising executable instructions; and one or more processors configured to execute the executable instructions and cause the apparatus to perform a method in accordance with any one of Clauses 1-9.

Clause 11: An apparatus, comprising means for performing a method in accordance with any one of Clauses 1-9.

Clause 12: A non-transitory computer-readable medium comprising executable instructions that, when executed by one or more processors of an apparatus, cause the apparatus to perform a method in accordance with any one of Clauses 1-9.

Clause 13: A computer program product embodied on a computer-readable storage medium comprising code for performing a method in accordance with any one of Clauses 1-9.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of monitoring power consumption of a wireless modem of wireless communication devices (e.g., a UE) and debugging power consumption issues within the wireless modem. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for debugging a wireless modem, comprising:
    determining a benchmark current value for the wireless modem;
    measuring an actual current value of the wireless modem;
    transitioning the wireless modem into a shutdown mode when the measured actual current value is greater than the benchmark current value for a threshold amount of time; and
    generating, after transitioning the wireless modem into the shutdown mode, a crash report, the crash report including operating information associated with a plurality of clients associated with the wireless modem prior to transitioning the wireless modem into the shutdown mode.

2. The method of claim 1, further comprising receiving a vote from each of one or more clients of the plurality of clients associated with the wireless modem, wherein determining the benchmark current value for the wireless modem is based on the received votes from each of the one or more clients of the plurality of clients associated with the wireless modem.

3. The method of claim 2, further comprising:
    determining an individual benchmark current value for each of the one or more clients for which a vote is received; and
    aggregating the individual benchmark current values to determine the benchmark current value for the wireless modem.

4. The method of claim 1, further comprising determining that operations associated with one or more clients of the plurality of clients have been completed.

5. The method of claim 4, wherein, based on the determination that the operations associated with one or more clients of the plurality of clients have been completed, the benchmark current value for the wireless modem comprises a benchmark current value for an idle mode of the wireless modem.

6. The method of claim 1, wherein the plurality of clients comprise at least two of:
    a single-carrier radio transmission technology client,
    a code division multiple access client,
    a third generation (3G) evolution data (EV-DO) client,
    a fourth generation (4G) long term evolution (LTE) client,
    a fifth generation (5G) new radio (NR) client,
    a wideband code division multiple access client,
    a global positioning system client,
    a wide area network client, or
    a power down client.

7. The method of claim 1, further comprising transmitting the crash report to a base station using the wireless modem.

8. The method of claim 1, further comprising outputting the crash report for transmission via hardwire connection.

9. The method of claim 1, wherein the operating information associated with the plurality of clients comprises one or more of:
    a list of active clients of the plurality of clients,
    a list of inactive clients of the plurality of clients,
    benchmark current values for active clients of the plurality of clients,
    a clock frequency of the wireless modem,
    the measured actual current value of the wireless modem,
    the determined benchmark current value for the wireless modem,
    an active duration for each active client of the plurality of clients,
    an amount of power consumed by the wireless modem, or
    a sleep or idle mode duration associated with each active client of the plurality of clients.

10. An apparatus for debugging a wireless modem, comprising:
    a memory comprising executable instructions; and
    one or more processors configured to execute the executable instructions and cause the apparatus to:
        determine a benchmark current value for the wireless modem;
        measure an actual current value of the wireless modem;
        transition the wireless modem into a shutdown mode when the measured actual current value is greater than the benchmark current value for a threshold amount of time; and
        generate, after transitioning the wireless modem into the shutdown mode, a crash report, the crash report including operating information associated with a plurality of clients associated with the wireless modem prior to transitioning the wireless modem into the shutdown mode.

11. The apparatus of claim 10, wherein the one or more processors are further configured to cause the apparatus to receive a vote from each of one or more clients of the plurality of clients associated with the wireless modem, wherein the one or more processors are configured to cause the apparatus to determine the benchmark current value for the wireless modem based on the received votes from each of the one or more clients of the plurality of clients associated with the wireless modem.

12. The apparatus of claim 11, wherein the one or more processors are further configured to:
    determine an individual benchmark current value for each of the one or more clients for which a vote is received; and
    aggregate the individual benchmark current values to determine the benchmark current value for the wireless modem.

13. The apparatus of claim 10, wherein the one or more processors are further configured to determine that operations associated with one or more clients of the plurality of clients have been completed.

14. The apparatus of claim 13, wherein, based on the determination that the operations associated with one or more clients of the plurality of clients have been completed, the benchmark current value for the wireless modem comprises a benchmark current value for an idle mode of the wireless modem.

15. The apparatus of claim 10, wherein the plurality of clients comprise at least two of:
    a single-carrier radio transmission technology client,
    a code division multiple access client,
    a third generation (3G) evolution data (EV-DO) client,
    a fourth generation (4G) long term evolution (LTE) client,
    a fifth generation (5G) new radio (NR) client,
    a wideband code division multiple access client,
    a global positioning system client,
    a wide area network client, or
    a power down client.

16. The apparatus of claim 10, wherein the one or more processors are further configured to transmit the crash report to a base station using the wireless modem.

17. The apparatus of claim 10, wherein the one or more processors are further configured to output the crash report for transmission via hardwire connection.

18. The apparatus of claim 10, wherein the operating information associated with the plurality of clients comprises one or more of:
    a list of active clients of the plurality of clients,
    a list of inactive clients of the plurality of clients,
    benchmark current values for active clients of the plurality of clients,
    a clock frequency of the wireless modem,
    the measured actual current value of the wireless modem,
    the determined benchmark current value for the wireless modem,
    an active duration for each active client of the plurality of clients,
    an amount of power consumed by the wireless modem, or
    a sleep or idle mode duration associated with each active client of the plurality of clients.

19. A non-transitory computer-readable medium for debugging a wireless modem, comprising:
    executable instructions that, when executed by one or more processors of an apparatus, cause the apparatus to:
        determine a benchmark current value for the wireless modem;
        measure an actual current value of the wireless modem;
        transition the wireless modem into a shutdown mode when the measured actual current value is greater than the benchmark current value for a threshold amount of time; and
        generate, after transitioning the wireless modem into the shutdown mode, a crash report, the crash report including operating information associated with a plurality of clients associated with the wireless modem prior to transitioning the wireless modem into the shutdown mode.

20. The non-transitory computer-readable medium of claim 19, further comprising executable instructions that cause the apparatus to receive a vote from each of one or more clients of the plurality of clients associated with the wireless modem, wherein the executable instructions that cause the apparatus to determine the benchmark current value for the wireless modem include executable instructions that cause the apparatus to determine the benchmark current value for the wireless modem based on the received votes from each of the one or more clients of the plurality of clients associated with the wireless modem.

21. The non-transitory computer-readable medium of claim 20, further comprising executable instructions that cause the apparatus to:

determine an individual benchmark current value for each of the one or more clients for which a vote is received; and aggregate the individual benchmark current values to determine the benchmark current value for the wireless modem.

22. The non-transitory computer-readable medium of claim 19, further comprising executable instructions that cause the apparatus to determine that operations associated with one or more clients of the plurality of clients have been completed.

23. The non-transitory computer-readable medium of claim 22, wherein, based on the determination that the operations associated with one or more clients of the plurality of clients have been completed, the benchmark current value for the wireless modem comprises a benchmark current value for an idle mode of the wireless modem.

24. The non-transitory computer-readable medium of claim 19, wherein the plurality of clients comprise at least two of:
   a single-carrier radio transmission technology client,
   a code division multiple access client,
   a third generation (3G) evolution data (EV-DO) client,
   a fourth generation (4G) long term evolution (LTE) client,
   a fifth generation (5G) new radio (NR) client,
   a wideband code division multiple access client,
   a global positioning system client,
   a wide area network client, or
   a power down client.

25. The non-transitory computer-readable medium of claim 19, further comprising executable instructions that cause the apparatus to transmit the crash report to a base station using the wireless modem.

26. The non-transitory computer-readable medium of claim 19, further comprising executable instructions that cause the apparatus to output the crash report for transmission via hardwire connection.

27. The non-transitory computer-readable medium of claim 19, wherein the operating information associated with the plurality of clients comprises one or more of:
   a list of active clients of the plurality of clients,
   a list of inactive clients of the plurality of clients,
   benchmark current values for active clients of the plurality of clients,
   a clock frequency of the wireless modem,
   the measured actual current value of the wireless modem,
   the determined benchmark current value for the wireless modem,
   an active duration for each active client of the plurality of clients,
   an amount of power consumed by the wireless modem, or
   a sleep or idle mode duration associated with each active client of the plurality of clients.

28. An apparatus for debugging a wireless modem, comprising:
   means for determining a benchmark current value for the wireless modem;
   means for measuring an actual current value of the wireless modem;
   means for transitioning the wireless modem into a shutdown mode when the measured actual current value is greater than the benchmark current value for a threshold amount of time; and
   means for generating, after transitioning the wireless modem into the shutdown mode, a crash report, the crash report including operating information associated with a plurality of clients associated with the wireless modem prior to transitioning the wireless modem into the shutdown mode.

29. The apparatus of claim 28, wherein the operating information associated with the plurality of clients comprises one or more of:
   a list of active clients of the plurality of clients,
   a list of inactive clients of the plurality of clients,
   benchmark current values for active clients of the plurality of clients,
   a clock frequency of the wireless modem,
   the measured actual current value of the wireless modem,
   the determined benchmark current value for the wireless modem,
   an active duration for each active client of the plurality of clients,
   an amount of power consumed by the wireless modem, or
   a sleep or idle mode duration associated with each active client of the plurality of clients.

30. The apparatus of claim 28, wherein the plurality of clients comprise at least two of:
   a single-carrier radio transmission technology client,
   a code division multiple access client,
   a third generation (3G) evolution data (EV-DO) client,
   a fourth generation (4G) long term evolution (LTE) client,
   a fifth generation (5G) new radio (NR) client,
   a wideband code division multiple access client,
   a global positioning system client,
   a wide area network client, or
   a power down client.

* * * * *